(12) United States Patent
Prasad et al.

(10) Patent No.: US 8,156,214 B2
(45) Date of Patent: Apr. 10, 2012

(54) SYSTEM AND METHOD TO DISCOVER CLIENTS ASSOCIATED WITH LOCAL DOMAIN NAME SERVER USING SAMPLING

(75) Inventors: Vishwa M. Prasad, Old Bridge, NJ (US); Anestis Karasaridis, Oceanport, NJ (US)

(73) Assignee: AT&T Intellectual Property I, LP, Reno, NV (US)

( * ) Notice: Subject to any disclaimer, the term of this patent is extended or adjusted under 35 U.S.C. 154(b) by 0 days.

(21) Appl. No.: 12/645,008

(22) Filed: Dec. 22, 2009

(65) Prior Publication Data

US 2011/0153864 A1      Jun. 23, 2011

(51) Int. Cl.
*G06F 15/173* (2006.01)

(52) U.S. Cl. ........................................ 709/223

(58) Field of Classification Search .................. 709/223
See application file for complete search history.

(56) References Cited

U.S. PATENT DOCUMENTS

| 6,968,389 | B1 | | 11/2005 | Menditto et al. | |
|---|---|---|---|---|---|
| 7,086,061 | B1 | * | 8/2006 | Joshi et al. | 718/105 |
| 7,574,499 | B1 | * | 8/2009 | Swildens et al. | 709/223 |
| 7,590,739 | B2 | * | 9/2009 | Swildens et al. | 709/226 |
| 7,647,424 | B2 | * | 1/2010 | Kim et al. | 709/238 |
| 7,725,602 | B2 | * | 5/2010 | Liu et al. | 709/245 |
| 7,730,187 | B2 | * | 6/2010 | Raciborski et al. | 709/226 |
| 2001/0052016 | A1 | | 12/2001 | Skene et al. | |
| 2006/0020660 | A1 | | 1/2006 | Prasad et al. | |
| 2006/0288119 | A1 | * | 12/2006 | Kim et al. | 709/238 |
| 2008/0086574 | A1 | * | 4/2008 | Raciborski et al. | 709/245 |
| 2008/0235400 | A1 | * | 9/2008 | Slocombe et al. | 709/245 |
| 2009/0248893 | A1 | * | 10/2009 | Richardson et al. | 709/239 |
| 2009/0327489 | A1 | * | 12/2009 | Swildens et al. | 709/224 |
| 2009/0327517 | A1 | * | 12/2009 | Sivasubramanian et al. | 709/238 |
| 2010/0125673 | A1 | * | 5/2010 | Richardson et al. | 709/239 |
| 2010/0125675 | A1 | * | 5/2010 | Richardson et al. | 709/242 |

\* cited by examiner

*Primary Examiner* — Wing Chan
*Assistant Examiner* — Alicia Baturay
(74) *Attorney, Agent, or Firm* — Larson Newman, LLP

(57) ABSTRACT

A system includes an analyzer module, a content request data collection module, and a domain name server. The content request data collection module is configured to receive a content request sent to a tracking address, collect content request information about the content request, and provide the content request information to the analyzer module. The domain name server is configured to receive an address request from a local domain name server for a cache server address, provide a tracking address to the local domain name server, collect address request information about the address request, and provide the address request information to the analyzer module. The analyzer module is configured to receive the address request information and the content request information, and determine properties of clients served by the local domain name server based on the address request information and the content request information.

19 Claims, 5 Drawing Sheets ional teachings herein. In general, statements made in the
specification of the present application do not necessarily
limit any of the various claimed inventions. Moreover, some
statements may apply to some inventive features but not to
others.

SYSTEM AND METHOD TO DISCOVER CLIENTS ASSOCIATED WITH LOCAL DOMAIN NAME SERVER USING SAMPLING

FIELD OF THE DISCLOSURE

The present disclosure generally relates to communications networks, and more particularly relates to a system and method to discover clients associated with local Domain Name Server using sampling.

BACKGROUND

Packet-switched networks, such as networks based on the TCP/IP protocol suite, can distribute a rich array of digital content to a variety of client applications. One popular application is a personal computer browser for retrieving documents over the Internet written in the Hypertext Markup Language (HTML). Frequently, these documents include embedded content. Where once the digital content consisted primarily of text and static images, digital content has grown to include audio and video content as well as dynamic content customized for an individual user.

It is often advantageous when distributing digital content across a packet-switched network to divide the duty of answering content requests among a plurality of geographically dispersed servers. For example, popular Web sites on the Internet often provide links to "mirror" sites that replicate original content at a number of geographically dispersed locations. A more recent alternative to mirroring is content distribution networks (CDNs) that dynamically redirect content requests to a cache server situated closer to the client issuing the request. CDNs either co-locate cache servers within Internet Service Providers or deploy them within their own separate networks.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
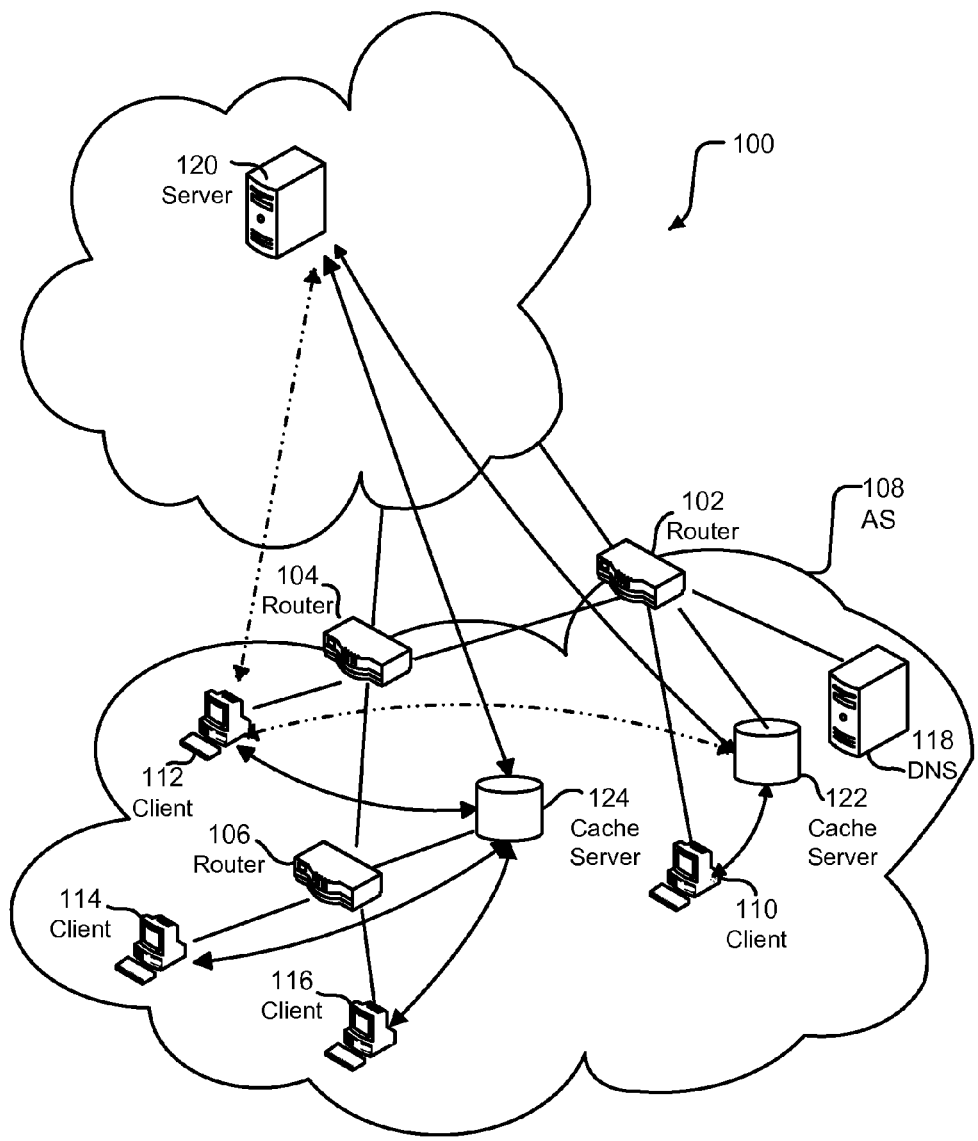
FIG. 1 is a block diagram illustrating a communications network in accordance with an embodiment of the present disclosure.

FIG. 1 shows a geographically dispersed network 100, such as the Internet. Network 100 can include routers 102, 104, and 106 that communicate with each other and form an autonomous system (AS) 108. AS 108 can connect to other ASs that form network 100 through peering points at routers 102 and 104. Additionally, AS 108 can include client systems 110, 112, 114, and 116 connected to respective routers 102, 104, and 106 to access the network 100. Router 102 can provide ingress and egress for client system 110. Similarly, router 104 can provide ingress and egress for client system 112. Router 106 can provide ingress and egress for both of client systems 114 and 116.

AS 108 can further include a Domain Name System (DNS) server 118. DNS server 118 can translate a human readable hostname, such as "www.att.com," into an Internet Protocol (IP) address. For example, client system 110 can send a request to resolve a hostname to DNS server 118. DNS server 118 can provide client system 110 with an IP address corresponding to the hostname. DNS server 118 may provide the IP address from a cache of hostname-IP address pairs or may request the IP address corresponding to the hostname from an authoritative DNS server for the domain to which the hostname belongs.

Client systems 110, 112, 114, and 116 can retrieve information from a server 120. For example, client system 112 can retrieve a web page provided by server 120. Additionally, client system 112 may download content files, such as graphics, audio, and video content, and program files such as software updates, from server 120. The time required for client system 112 to retrieve the information from the server 120 normally is related to the size of the file, the distance the information travels, and congestion along the route. Additionally, the load on the server 120 is related to the number of client systems 110, 112, 114, and 116 that are actively retrieving information from the server 120. As such, the resources such as processor, memory, and bandwidth available to the server 120 limit the number of client systems 110, 112, 114, and 116 that can simultaneously retrieve information from the server 120.

Additionally, the network can include cache servers 122 and 124 that replicate content on the server 120 and that can be located more closely within the network to the client systems 110, 112, 114, and 116. Cache server 122 can link to router 102, and cache server 124 can link to router 106. Client systems 110, 112, 114, and 116 can be assigned cache server 122 or 124 to decrease the time needed to retrieve information, such as by selecting the cache server closer to the particular client system. The network distance between a cache server and client system can be determined by network cost and access time. As such, the effective network distance between the cache server and the client system may be different from the geographic distance.

When assigning cache servers 122 and 124 to client systems 110, 112, 114, and 116, the cache server closest to the client can be selected. The closest cache server may be the cache server having a shortest network distance, a lowest network cost, a lowest network latency, a highest link capacity, a lowest load, or any combination thereof. Client system 110 can be assigned cache server 122, and client systems 114 and 116 can be assigned to cache server 124. The network costs of assigning client system 112 to either of cache server 122 or 124 may be substantially identical. When the network costs associated with the link between router 102 and router 104 are marginally lower than the network costs associated with the link between router 104 and router 106, client 112 may be assigned to cache server 124.

Client system 112 may send a request for information to cache server 124. If cache server 124 has the information stored in a cache, it can provide the information to client system 112. This can decrease the distance the information travels and reduce the time to retrieve the information. Alternatively, when cache server 124 does not have the information, it can retrieve the information from server 120 prior to providing the information to the client system 112. In an embodiment, cache server 124 may attempt to retrieve the information from cache server 122 prior to retrieving the information from server 120. The cache server 124 may retrieve the information from the server 120 only once, reducing the load on server 120 and network 100 such as, for example, when client system 114 requests the same information.

Cache server 124 can have a cache of a limited size. The addition of new content to the cache may require old content to be removed from the cache. The cache may utilize a least recently used (LRU) policy, a least frequently used (LFU) policy, or another cache policy known in the art. When the addition of relatively cold or less popular content to the cache causes relatively hot or more popular content to be removed from the cache, an additional request for the relatively hot content can increase the time required to provide the relatively hot content to the client system, such as client system 114. To maximize the cost and time savings of providing content from the cache, the most popular content may be stored in the cache, while less popular content is retrieved from server 120.

Figure 2:
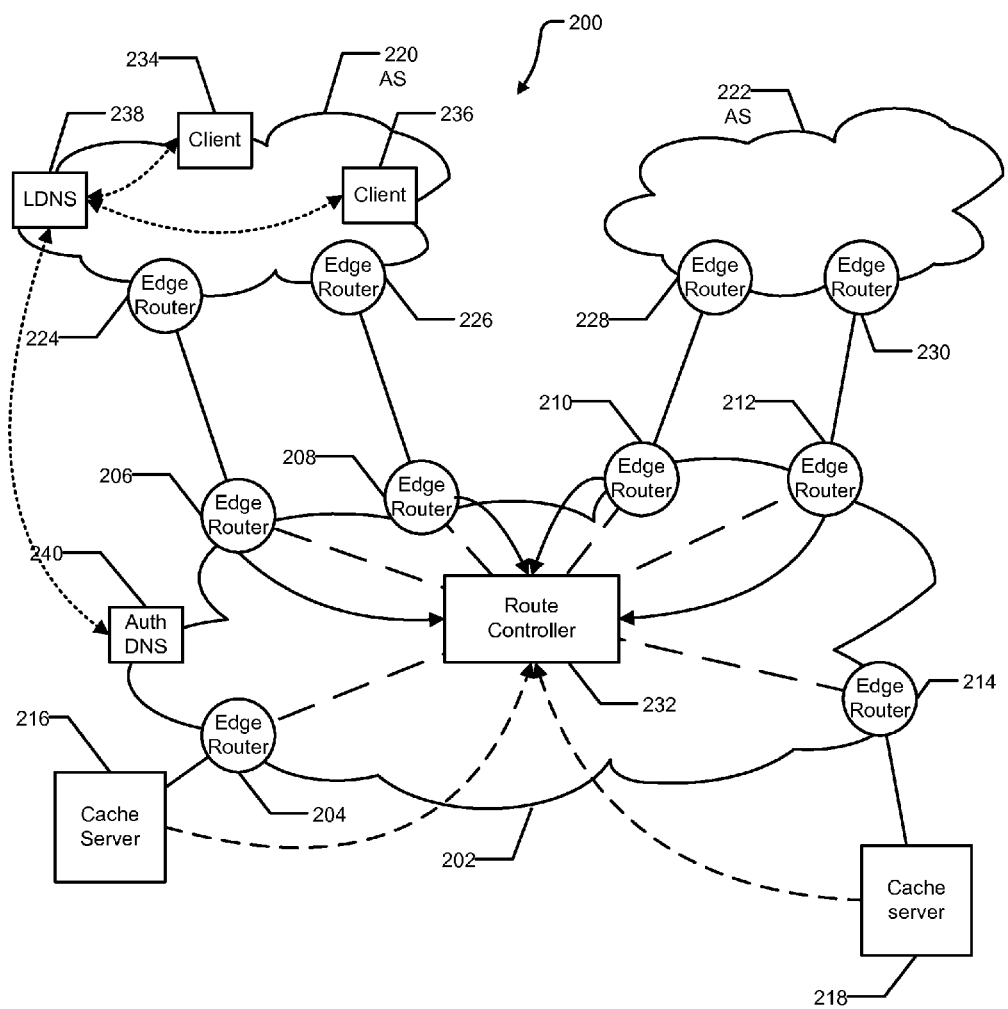
FIG. 2 is a block diagram illustrating an anycast CDN system in accordance with an embodiment of the present disclosure.

FIG. 2 illustrates an anycast CDN system 200 that can be used in conjunction with communications network 100. The anycast CDN system 200 can include a CDN provider network 202. The CDN provider network 202 can include a plurality of provider edge routers 204, 206, 208, 210, 212, and 214. The provider edge routers 204, 206, 208, 210, 212, and 214 can serve as ingress points for traffic destined for the CDN provider network 202, and egress points for traffic from the CDN provider network 202 destined for the rest of the Internet. The anycast CDN system 200 can further include cache servers 216 and 218. Cache server 216 can receive traffic from the CDN provider network 202 through provider edge router 204, and cache server 218 can receive traffic from the CDN provider network 202 through edge cache router 214. In addition to providing CDN service to clients within the CDN provider network, the anycast CDN system 200 can provide CDN service to clients within AS 220 and AS 222. AS 220 can include provider edge routers 224 and 226 with peering connections to provider edge routers 206 and 208, respectively. Similarly, AS 222 can include provider edge routers 228 and 230 with peering connections to provider edge routers 210 and 212 respectively. Requests for content from systems within either AS 220 or AS 222 may enter the CDN provider network through the appropriate peering points and be directed to either cache server 216 or 218.

Anycast CDN system 200 can also include a route controller 232. The route controller 232 can exchange routes with provider edge routers 206, 208, 210, and 212 within the CDN provider network 202. As such, the route controller 232 can influence the routes selected by the provider edge routers 206, 208, 210, and 212. Additionally, the route controller 232 can receive load information from cache servers 216 and 218. The load information can include available bandwidth, bandwidth utilization, CPU utilization, memory utilization, number of requests being served, or the like.

Cache servers 216 and 218 can advertise, such as through Border Gateway Protocol (BGP), a shared anycast address to the CDN provider network 202, specifically to provider edge routers 204 and 214. Provider edge routers 204 and 214 can advertise the anycast address to the route controller 232. The route controller 232 can provide a route to the anycast address to each of the provider edge routers 206, 208, 210, and 212. Provider edge routers 206, 208, 210, and 212 can direct traffic addressed to the anycast address to either of the cache servers 216 and 218 based on the routes provided by the route controller 232. Additionally, the provider edge routers 206, 208, 210, and 212 can advertise the anycast address to AS 220 and to AS 222. The route controller 232 can manipulate the route provided to provider edge routers 206, 208, 210, and 212 based on the load on the cache servers 216 and 218, network bandwidth, network cost, network distance, or any combination thereof. Altering the route to the anycast address can change which of cache servers 216 and 218 serve content to client systems within the CDN provider network 202, AS 220, and AS 222.

In an embodiment, AS 220 may be an unstable network. Traffic from client systems within the AS 220 may enter the CDN provider network 202 at both provider edge routers 206 and 208. Anycast traffic entering the CDN provider network 202 at provider edge router 206 may be directed to cache server 216 while anycast traffic entering at provider edge router 208 may be directed to cache server 218. Internal routing changes within AS 220 can cause traffic from a client system within AS 220 to be shifted from cache server 216 to cache server 218, resulting in disruptions to persistent and/or secure connections.

In an embodiment, it can be preferable to assign a cache server and provide a unicast address to the cache server for clients systems 234 and 236 within AS 220. However, clients systems 234 and 236 in AS 220 can receive the address indirectly through a local DNS server 238. When an authoritative DNS server 240 for CDN system 200 receives a request for a cache server address from local DNS server 238, authoritative DNS server 240 may not be aware of the number of client systems served by local DNS server 238, the location of the client systems 234 and 236 relative to local DNS server 238, or the ingress point for the client systems 234 and 236. As such, it may not be possible for authoritative DNS server 240 to optimize routing of the client request to the closest cache server or to properly load balance among multiple cache servers.

Figure 3:
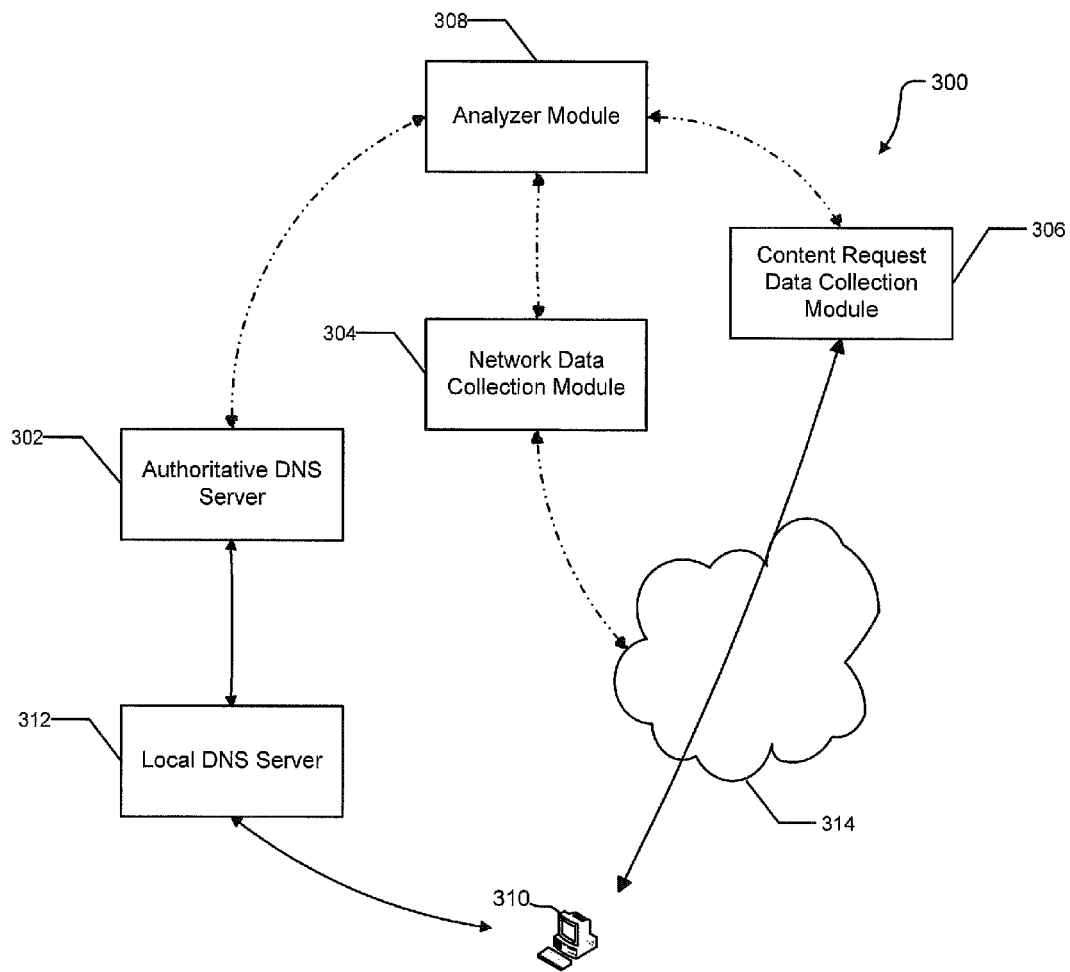
FIG. 3 is a block diagram illustrating an exemplary system for determining the characteristics of client systems served by a local Domain Name System (DNS) server.

FIG. 3 illustrates an exemplary system, generally designated 300, for determining the characteristics of the client systems served by a local DNS server. System 300 can include an authoritative DNS server 302, a network data collection module 304, a content request data collection module 306, and an analyzer module 308. Client system 310 can send an address request to local DNS server 312 to determine an IP address for a cache server. Local DNS server 312 can send an address request to authoritative DNS server 302. A portion of the time, authoritative DNS server 302 can provide an IP address for a cache server, either by providing an anycast address or a unicast address. However, authoritative DNS server 302 can periodically provide a tracking IP address associated with the content request data collection module 306 to local DNS server 312. When authoritative DNS server 302 provides the tracking address to local DNS server 312, authoritative DNS server 302 can log address request information. The address request information can include the time of the address request, the requested domain name, the tracking IP address, the IP address of the local DNS server, or the like.

In an embodiment, authoritative DNS server 302 can provide the tracking IP address at a predefined rate, that is once per a given number of requests, or authoritative DNS server 302 can provide the tracking IP address at a predefined time interval, that is once per a given number of seconds. Additionally, the tracking IP address can be provided to a predefined set of local DNS servers. For example, tracking IP addresses can be provided periodically to local DNS servers associated with particular ASes while local DNS servers associated with other ASes may not receive tracking IP addresses.

Local DNS server 312 can provide the tracking IP address to client system 310. Client system 310 can send a content request to the tracking IP address. Based on the tracking IP address, the content request can be directed, through network 314, to content request data collection module 306. Content request data collection module 306 can log content request information related to the content request. The content request information can include the time of the content request, the IP address of the client system, the tracking IP address used, round-trip-delay, the domain of the requested content, or the like. Content request data collection module 306 can provide the content request information to the analyzer module 308 periodically in a batch, or as the information is collected.

In an embodiment, content request data collection module 306 can provide the requested content to client system 310 or can redirect client system 310 to a cache server for receiving the requested content. Content request data collection module 306 can include a cache server, a redirector, a multi-layer or load balancing switch, or the like, or any combination thereof.

In an embodiment, the tracking IP address can be a unicast IP address directing the request to a cache server. The tracking IP address can be different from the unicast IP address typically used by client systems when requesting content from the cache server. Upon receiving a content request directed to the tracking IP address, the cache server can provide the requested content and collect the content request information.

In another embodiment, the tracking IP address can be an anycast IP address. The tracking IP address can be different from the anycast IP address typically used by client systems when requesting content from the cache server. Requests sent to the tracking IP address may be directed to one or more cache servers. Upon receiving a content request directed to the tracking IP address, the cache server can provide the requested content and collect the content request information.

In yet another embodiment, the tracking IP address can be a shadow IP address directing the request to a multi-layer switch or a load balancing switch. The switch can perform load balancing of the content requests over a plurality of cache servers. The switch can direct the content request to one of the cache servers and the cache server can provide the requested content. The content request can be directed to the cache server at a different address than is typically used for content requests, at a different port than is typically used for content requests, or any combination thereof. The switch, the cache server, or any combination thereof can collect content request information to be provided to analyzer module 308.

In a further embodiment, the tracking IP address can be a unicast IP address directing the request to a redirector. Upon receiving a content request directed to the tracking IP address, the redirector can utilize the IP address of the client system to determine the optimal cache server for serving the content, and redirect the client system to the cache server to receive the requested content. The cache server can provide the requested content to the client system, and the redirector can collect content request information.

In yet another embodiment, the tracking IP address can be an anycast IP address directing the request to one or more redirectors. Upon receiving a content request directed to the tracking IP address, the redirector can utilize the IP address of the client system to determine the optimal cache server for serving the content, and redirect the client system to the cache server to receive the requested content. The cache server can provide the requested content to the client system, and the redirector can collect content request information.

Network data collection module 304 can collect network data, such as netflow data, from network 314. For example, the network data can be used to identify the path taken by the content request, including determining the ingress point. In an embodiment, the network data can be collected in response to a trigger. For example, a trigger can be sent to network monitoring devices within the network 314, such as routers, ingress and egress points, or packet sniffers. The trigger can indicate a rule for identifying traffic of interest, such as a source IP, a destination IP, a source port, a destination port, a network protocol, or other information contained within packet headers. Additionally, the trigger can include duration. The network monitoring devices can identify traffic that matches the rule passing through the network during the duration of the rule. In this way, the amount of network data collected and processed can be reduced.

Analyzer module 308 can consider the address request information, the content request information, and the network data to determine information about client systems served by the local DNS. The information about client systems served by the local DNS can include a number of the clients, an identity of the clients, an ingress point for the clients, a round trip time for the clients, the workload required to respond to the clients, time dependant patterns of activity for the clients, or any combination thereof. Additionally, analyzer module 308 can identify an ingress point for the local DNS server based on the address request information, the content request information, and the network data.

In an embodiment, the authoritative DNS server can include more than one authoritative DNS servers, each responding to an anycast address. An address request from the local DNS server can be sent to the anycast address for the authoritative DNS servers. Determining the ingress point for the local DNS server can be at least partially based on which authoritative DNS server receives the request. Similarly, when the content requests are directed to an anycast address, determining the ingress point for the client systems can be at least partially based on which cache server, redirector, or switch receives the content request.

In an embodiment, analyzer module 308 can match the client system with the local DNS server based on the tracking IP address. Additionally, the analyzer module 308 can monitor changes in the client systems served by the local DNS and the types and volumes of requests made by the client systems to obtain time dependant expectations of the requests associated with the local DNS server. This information can be used to better manage request distributions among cache servers within the CDN system. For example, analyzer module 308 can provide the information to the authoritative DNS server 302, a route controller, such as route controller 232, or a provisioning system. The information can be used to modify load balancing among the cache servers, modify routing of requests to cache servers, modifying routing of requests to DNS servers, provisioning of cache servers, or any combination thereof. For example, authoritative DNS server 302 can modify the unicast addresses provided to local DNS servers based on the information about the client systems served by the local DNS servers. In another example, the route controller can modify the routing of content requests in response to the information about the client systems served by the local DNS.

Figure 4:
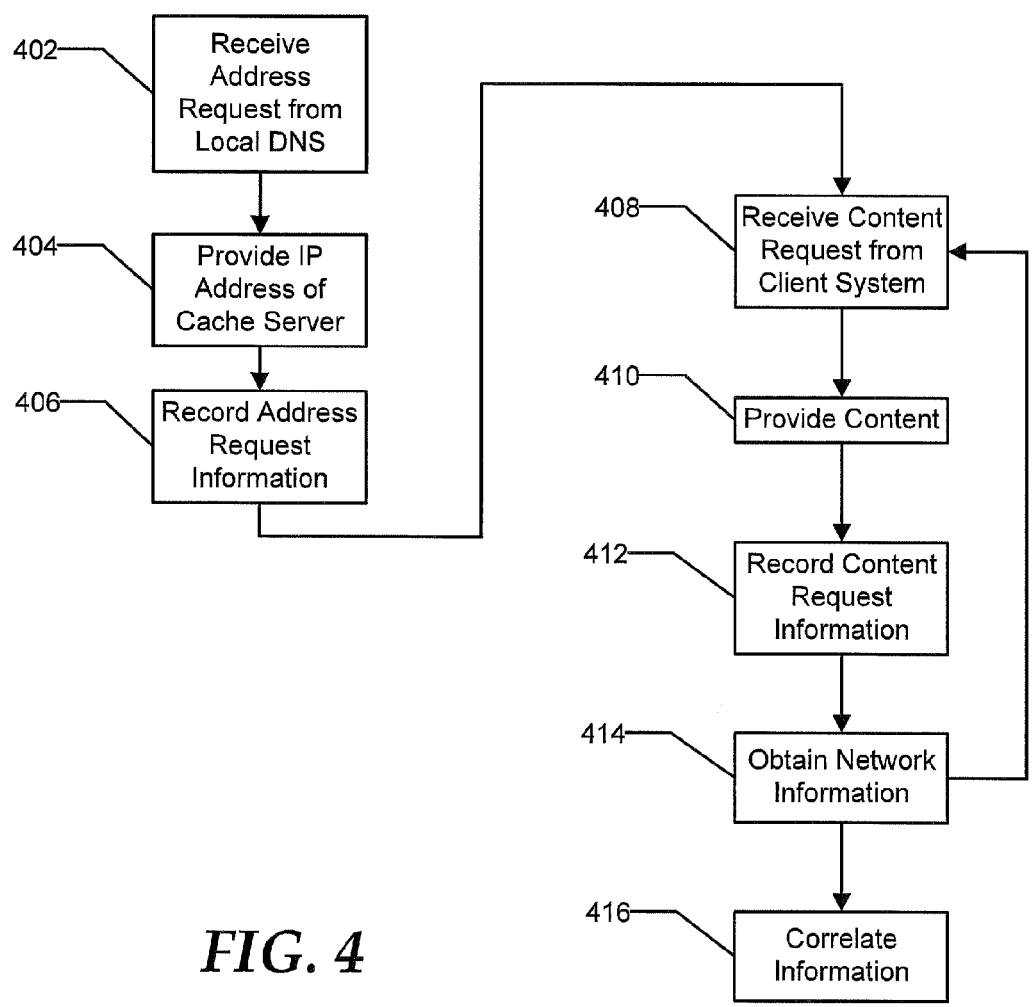
FIG. 4 is a flow diagram illustrating an exemplary method for determining the characteristics of client system served by a local DNS server.

FIG. 4 illustrates an exemplary method of determining characteristics of client systems served by a local DNS server. At 402, the system can receive an address request for an IP address of a cache server from the local DNS server. At 404, the system can provide a tracking IP address to the local DNS server. At 406, the system can record address request information related to the address request. The address request information can include the time of the address request, the requested domain name, the tracking IP address, and the IP address of the local DNS server.

At 408, a content request from a client system can be received at a cache server. The content request can be addressed to the tracking IP address. At 410, the cache server can provide the requested content to the client system. At 412, the cache server can record content request information about the content request. The content request information can include the time of the content request, the IP address of the client system, the tracking IP address used, round-trip-delay, the domain of the requested content, and other relevant information about the content request.

At 414, network information related to the content request can be obtained. The network information can include netflow information and the like. At 416, the address request information, the content request information, and the network information can be correlated to identify the characteristics of the client systems served by the local DNS server.

In an example, each time a tracking IP address is provided to the local DNS server, a number of content requests sent to the tracking IP address can be received from client systems served by the local DNS server. The tracking IP address can be unique to the local DNS server for a period of time. As such, all requests to the tracking IP address can be from client systems served by the local DNS server. The content request information can provide the IP addresses of the client systems served by the local DNS. Additionally, based on the round-trip-time and the network information associated with each content request, the system can determine an approximate location within the network for each of the client systems. Further, by periodically sampling the client systems associated with the local DNS server, the system can obtain time dependant information about the client systems served by the local DNS server, such as periods of peak activity or the like. Using the information obtained by the sampling process, the CDN can more effectively optimize routing of the client request to the closest cache server and to load balance among multiple cache servers.

Figure 5:
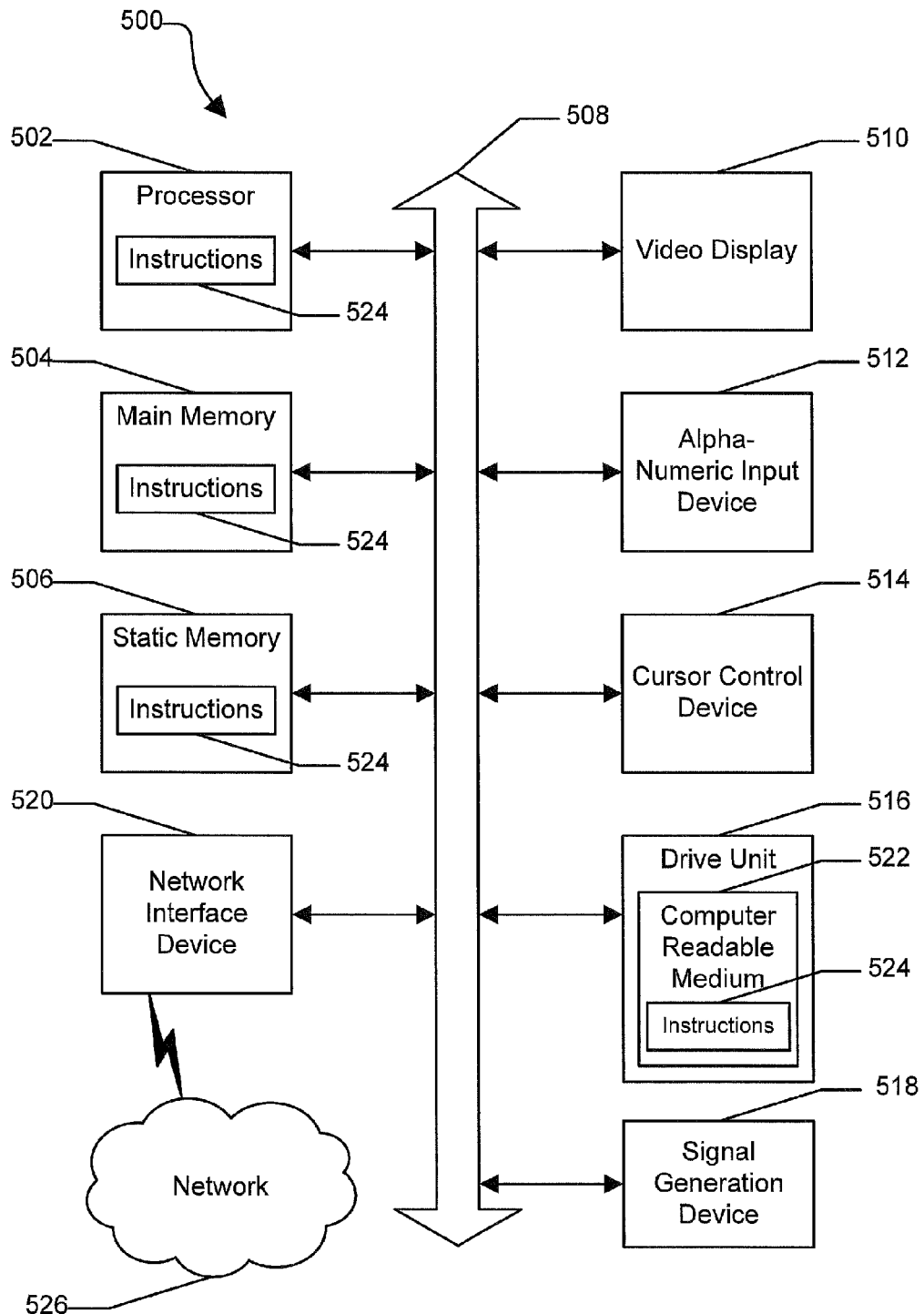
FIG. 5 is an illustrative embodiment of a general computer system.

FIG. 5 shows an illustrative embodiment of a general computer system 500. The computer system 500 can include a set of instructions that can be executed to cause the computer system to perform any one or more of the methods or computer based functions disclosed herein. The computer system 500 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 500 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

The computer system 500 may include a processor 502, such as a central processing unit (CPU), a graphics processing unit (GPU), or both. Moreover, the computer system 500 can include a main memory 504 and a static memory 506 that can communicate with each other via a bus 508. As shown, the computer system 500 may further include a video display unit 510 such as a liquid crystal display (LCD), an organic light emitting diode (OLED), a flat panel display, a solid-state display, or a cathode ray tube (CRT). Additionally, the computer system 500 may include an input device 512 such as a keyboard, and a cursor control device 514 such as a mouse. Alternatively, input device 512 and cursor control device 514 can be combined in a touchpad or touch sensitive screen. The computer system 500 can also include a disk drive unit 516, a signal generation device 518 such as a speaker or remote control, and a network interface device 520 to communicate with a network 526. In a particular embodiment, the disk drive unit 516 may include a computer-readable medium 522 in which one or more sets of instructions 524, such as software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media.

The previously discussed modules can be implemented in hardware, software, or any combination thereof. Each module may include one or more computer systems. When a module includes more than one computer system, the functions of the module can be distributed across the multiple computer systems in a symmetric manner, i.e., each computer system performs the same type of tasks, or in an asymmetric manner, i.e., two computer systems of the module may perform different tasks.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A content delivery system comprising:
   an analyzer module;
   a content request data collection module configured to:
      receive a content request sent to a tracking address;
      collect content request information about the content request; and
      provide the content request information to the analyzer module; and
   a hardware domain name server, the domain name server configured to:
      receive a first address request from a local domain name server for a cache server address;
      provide an internet protocol address for the cache server in response to receiving the first address request;
      receive a second address request from the local domain name server for the cache server address;
      provide the tracking address to the local domain name server in response to receiving the second address request, wherein providing the tracking address to the local domain name server is in response to a predefined time interval;
      collect address request information about the first address request and the second address request; and
      provide the address request information to the analyzer module;
   wherein the analyzer module is configured to:
      receive the address request information and the content request information; and
      determine information about clients served by the local domain name server based on the address request information and the content request information; and
   wherein the hardware domain name server is further configured to modify one of a load balancing among cache servers, a routing of requests to the cache servers, and a provisioning of the cache servers based on the client information.

2. The content delivery system of claim 1, wherein the information about clients served by the local domain name server include a number of the clients, an identity of the clients, an ingress point for the clients, a round trip time for the clients, a workload required to respond to the clients, time dependant patterns of activity for the clients, and any combination thereof.

3. The content delivery system of claim 1, wherein the analyzer module is further configured to provide the information about clients served by the local domain name server to one of the domain name server, a provisioning server, a route controller, and any combination thereof.

4. The content delivery system of claim 1, further comprising a network data collection module configured to obtain network data associated with the content request.

5. The content delivery system of claim 1, wherein the analyzer module is further configured to receive network data associated with the content request, and wherein determining information about clients served by the local domain name server is further based on the network data associated with the content request.

6. The content delivery system of claim 1, wherein the address request information includes one of the time of the address request, the requested domain name, the tracking Internet protocol address, the Internet protocol address of the local domain name system server, and any combination thereof.

7. The content delivery system of claim 1, wherein the content request information includes one of the time of the content request, the Internet protocol address of the client system, the tracking IP address used, round-trip-delay, the domain of the requested content, and any combination thereof.

8. The content delivery system of claim 1, wherein the content request data collection module is further configured to provide content in response to the content request.

9. A server comprising:
   a memory; and
   a processor coupled to the memory and configured to:
      receive from a local domain name server a first address request for a cache server address;
      provide an internet protocol address for the cache server in response to receiving the first address request;
      receive from the local domain name server a second address request for the cache server address;
      receive address request information from an authoritative domain name server, the address request information associated with a tracking address provided by the authoritative domain name server to the local domain name server in response to the second address request from the local domain name server, wherein providing the tracking address to the local domain name server is in response to a predefined time interval;
      receive content request information, the content request information associated with a content request sent to the tracking address by a client system served by the local domain name server;
      determine information about clients served by the local domain name server based on the address request information and the content request information;
      match the client system to the domain name server based upon the tracking address; and
      modify one of a load balancing among cache servers, a routing of requests to cache servers, and a provisioning of cache servers based on the client information.

10. The server of claim 9, wherein the information about clients served by the local domain name server includes one of a number of the clients, an identity of the clients, an ingress point for the clients, a round trip time for the clients, a workload required to respond to the clients, time dependant patterns of activity for the clients, and any combination thereof.

11. The server of claim 9, wherein the processor is further configured to provide the information about clients served by the local domain name server to one of the authoritative domain name server, a provisioning server, a route controller, and any combination thereof.

12. The server of claim 9, wherein the processor is further configured to receive network data associated with the content request, and wherein determining information about clients served by the local domain name server is further based on the network data associated with the content request.

13. The server of claim 9, wherein the address request information can include one of the time of the address request, the requested domain name, the tracking Internet protocol address, and the Internet protocol address of the local domain name system server.

14. The server of claim 9, wherein the content request information can include one of the time of the content request, the Internet protocol address of the client system, the tracking Internet protocol address used, round-trip-delay, and the domain of the requested content.

15. Machine-executable code embedded within a nontransitory medium, the machine-executable code including instructions for carrying out a method, the method comprising:
  receiving at a hardware domain name server a first address request from a local domain name server for a cache server address;
  providing an internet protocol address for the cache server in response to receiving the first address request;
  receiving at the hardware domain name server a second address request from the local domain name server for the cache server address;
  providing a tracking address to the local domain name server in response to receiving the second address request, wherein providing the tracking address to the local domain name server is in response to a predefined time interval;
  collecting address request information about the first address request and the second address request;
  receiving a content request sent to the tracking address;
  collecting content request information about the content request;
  determining information about clients served by the local domain name server based on the address request information and the content request information; and
  modifying one of a load balancing among cache servers, a routing of requests to cache servers, and a provisioning of cache servers based on the properties of the clients served by the local domain name server.

16. The machine-executable code of claim 15, wherein the information about clients served by the local domain name server include one of a number of the clients, an identity of the clients, an ingress point for the clients, a round trip time for the clients, a workload required to respond to the clients, time dependant patterns of activity for the clients, and any combination thereof.

17. The machine-executable code of claim 15, the method further comprising receiving network data associated with the content request, and wherein determining the information about clients served by the local domain name server is further based on the network data associated with the content request.

18. The machine-executable code of claim 15, wherein the address request information can include one of the time of the address request, the requested domain name, the tracking Internet protocol address, and the Internet protocol address of the local domain name system server.

19. The machine-executable code of claim 15, wherein the content request information can include one of the time of the content request, the IP address of the client system, the tracking Internet protocol address used, round-trip-delay, and the domain of the requested content.

* * * * *